United States Patent [19]
Konishi et al.

[11] Patent Number: 5,204,791
[45] Date of Patent: Apr. 20, 1993

[54] TAPE LOADING DEVICE OF A VIDEO TAPE RECORDER HAVING A LINKAGE DRIVEN INCLINED AUXILIARY TAPE GUIDE MEMBER

[75] Inventors: Akio Konishi, Hirakata; Koichiro Hirabayashi, Osaka; Hideaki Yoshio, Moriguchi; Shuzo Takeda, Hirakata; Nobuaki Takagi, Neyagawa, all of Japan

[73] Assignee: Matsushita Electric Industrial Co., Ltd., Kadoma, Japan

[21] Appl. No.: 597,305

[22] Filed: Oct. 12, 1990

[30] Foreign Application Priority Data

Oct. 13, 1989 [JP] Japan .................................. 1-267326
Oct. 13, 1989 [JP] Japan .................................. 1-267328

[51] Int. Cl.⁵ .................... G11B 5/008; G11B 15/61; G11B 5/027
[52] U.S. Cl. ........................................ 360/95; 360/85
[58] Field of Search ............ 360/85, 95, 130.2, 130.21

[56] References Cited

U.S. PATENT DOCUMENTS

| | | | |
|---|---|---|---|
| 4,595,961 | 6/1986 | Kuwajima | 360/95 |
| 4,665,450 | 5/1987 | Hirano | 360/85 |
| 4,709,280 | 11/1987 | Delacou | 360/85 |
| 4,991,039 | 2/1991 | Kaku | 360/85 |
| 5,025,331 | 6/1991 | Hiayama et al. | 360/85 |
| 5,041,928 | 8/1991 | Sasaki et al. | 360/85 |
| 5,067,035 | 11/1991 | Kudelski et al. | 360/85 |
| 5,124,862 | 6/1992 | Sawano et al. | 360/95 |

FOREIGN PATENT DOCUMENTS

| | | |
|---|---|---|
| 0083932 | 7/1983 | European Pat. Off. |
| 0131413 | 1/1985 | European Pat. Off. |
| 0176802 | 4/1986 | European Pat. Off. |
| 0240925 | 10/1987 | European Pat. Off. |
| 0247442 | 12/1987 | European Pat. Off. |
| 61-13466 | 1/1986 | Japan |

*Primary Examiner*—Stuart S. Levy
*Assistant Examiner*—Jefferson Evans
*Attorney, Agent, or Firm*—Wenderoth, Lind & Ponack

[57] ABSTRACT

Disclosed is a tape loading device of a video tape recorder provided with an inclined video head cylinder and a capstan. The tape loading device includes a first guide member for feeding a tape on a horizontal path to the inclined video head cylinder, a second guide member for taking out the tape from the video head cylinder, and a third guide member for guiding the tape having passed the second guide member. The first, second and third guide members move along the video head cylinder and are in contact with the internal surface of the tape during the tape loading operation. The tape loading device further includes a fourth guide member for restoring the tape from an inclined path to a horizontal path during the tape loading operation by contacting the external surface of the tape, and an auxiliary inclined member for moving the tape inwardly during the tape loading operation so that the tape may be restored from an inclined path to a horizontal path. The auxiliary inclined member functions to make large the tape winding angle with respect to the third guide member. After the tape loading operation, a tape path is completed along the first guide member, the video head cylinder, the second, third and fourth members, and the capstan.

2 Claims, 8 Drawing Sheets

TAPE LOADING DEVICE OF A VIDEO TAPE RECORDER HAVING A LINKAGE DRIVEN INCLINED AUXILIARY TAPE GUIDE MEMBER

BACKGROUND OF THE INVENTION

1. Field of the Invention

The present invention generally relates to a video tape recorder, and more particularly, to a tape loading device of a video tape recorder.

2. Description of the Prior Art

According to the conventional tape loading device using parallel loading, a tape path is formed as shown in FIG. 1 when a tape loading operation has been completed. Immediately before the tape loading operation is started, loading guide posts 1a and 1b are inserted into respective openings 3a and 3b formed in the rear surface of a cassette 2 as shown by phantom lines. When the loading operation starts, the loading guide posts 1a and 1b move along the periphery of a video head cylinder 4 as shown by arrows A and B, respectively, so as to wind a tape 18 taken out of the cassette 2 around the video head cylinder 4. During the tape loading operation, guide posts 5, 6, and 7 and a pinch roller 15 move in the directions shown by arrows C, D, E, and F, respectively, thus forming a tape loop.

The tape 18 is fed from a supply reel 9 to the video head cylinder 4 through guide posts 5 and 10, a full-width erasing head 11, a guide post 12, and the loading guide post 1a. Then, the tape 18 is fed from the video head cylinder 4 to a take-up reel 16 of the cassette 2 through the loading guide post 1b, the guide post 6, a sound control head 13, a guide post 14, the gap between a capstan 8 and the pinch roller 15, and the guide post 7. Thus, the tape 18 is wound around the take-up reel 16.

In the loading guide post 1a, a vertical stationary post 17 and an inclined stationary post 19 for appropriately applying the tape 18 to the inclined video head cylinder 4 are mounted on a small base 20. In the loading guide post 1b, a stationary post 21 and a roller post 22 are mounted on a small base 23. In some conventional loading devices, each of the vertical stationary post 17 and the stationary post 21 is used as a roller post.

According to the above-described conventional construction, since a tape path (the height and inclination of the posts) is not completed in the course of the loading of the tape taken out of the video head cylinder 4, the tape may slip from the guide posts or may be twisted, thereby occasionally causing damage of the tape.

Furthermore, since the tape winding angle with respect to the stationary posts, for example the relative inclination stationary posts 21 and 6, is relatively large, the rate of increase in tape tension is very high at the location of the stationary posts. Therefore, the tape tension ahead of the capstan 8 becomes large. In order to reduce the fluctuation of the relative speed of the tape, it is necessary to make the capstan 8 large-sized, which results in an increase of electric power consumption. The use of the large capstan and the increase of electric power consumption are serious problems for a portable device such as a camera-integrated video tape recorder.

SUMMARY OF THE INVENTION

The present invention has been developed to substantially overcome the above-described problems inherent in the prior art tape loading device of a video tape recorder.

It is accordingly an object of the present invention to provide a tape loading device of a video tape recorder capable of preventing a tape from being damaged or twisted during the loading operation.

Another object of the present invention is to provide a tape loading device of a video tape recorder capable of reducing the fluctuation of the tape speed even though a small capstan is used.

In accomplishing these and other objects, a tape loading device according to the present invention is provided in a video tape recorder provided with an inclined video head cylinder and a capstan. The tape loading device includes a first guide member for feeding a tape on a horizontal path to the inclined video head cylinder, a second guide member for taking out the tape from the video head cylinder, and a third guide member for guiding the tape which has passed the second guide member. The first, second and third guide members move along the video head cylinder and are in contact with the internal surface of the tape during the tape loading operation.

The tape loading device further includes a fourth guide member for restoring the tape from an inclined path to the horizontal path during the tape loading operation by contacting an external surface of the tape, and an auxiliary inclined member for moving the tape inwardly during the tape loading operation so that the tape is restored from an inclined path to a horizontal path. The auxiliary inclined member functions to make the tape winding angle large with respect to the third guide member during the tape loading operation.

After the tape loading operation, a tape path is completed along the first guide member, the video head cylinder, the second, third and fourth members, and the capstan.

Preferably, a driving system for driving the auxiliary inclined member is comprised of a lever driven in synchronization with the tape loading operation and having a rack formed at one end thereof, a first link having a gear which is formed at one end thereof and which engages the rack, a second link having one end pivotally mounted on a base plate of the video tape recorder, and an arm member having one end pivotally connected with the other end of the first link, the other end on which the auxiliary inclined member is formed, and an intermediate portion pivotally connected with the other end of the second link.

According to the above-described construction, since the auxiliary inclined member is brought into contact with the tape from outside and pushes the tape inwardly in the course of the tape loading operation, the tape is moved upward along the inclined auxiliary inclined member. As a result, the tape is appropriately placed on a flange formed on the lower portion of the third guide member.

Since the tape winding angle with respect to the third guide member becomes large due to the inward movement of the tape caused by the auxiliary inclined member, the tape can be prevented from slipping down from the third guide member. Furthermore, the inclination of the auxiliary inclined member can prevent the tape from being undesirably twisted.

In another aspect of the present invention, the tape loading device according to the present invention includes an inclined post for feeding a tape on a horizontal path to the inclined video head cylinder, a first roller post for taking out the tape from the video head cylinder, and a second roller post for guiding the tape which has passed the first roller post. The inclined post, the first roller post and the second roller post move along the video head cylinder and are in contact with the internal surface of the tape during the tape loading operation.

The tape loading device further includes an inclined stationary post for moving the tape inwardly during the tape loading operation so that the tape will be returned from an inclined path to a horizontal path. The inclined stationary post functions to make the tape winding angle large with respect to the second roller post during the tape loading operation.

After the tape loading operation, a tape path is completed along the inclined post, the video head cylinder, the first and second roller posts, and the capstan.

According to the above-described construction, since the post for taking out the tape from the video head cylinder and the post for guiding the tape which has passed the above post are made of rotatable roller posts, the rotational load imposed upon the posts can be reduced, and therefore, the tension applied to the tape becomes small. Furthermore, since the second roller post is located in the vicinity of the inclined stationary post, a required small amount of tape is applied to the inclined stationary post by the second roller post, thereby reliably restoring the inclined tape path to the horizontal tape path.

BRIEF DESCRIPTION OF THE DRAWINGS

These and other objects and features of the present invention will become more apparent from the following description of the preferred embodiment thereof with reference to the accompanying drawings, throughout which like parts are designated by like reference numerals, and wherein.

DETAILED DESCRIPTION OF THE PREFERRED EMBODIMENTS

Figure 2:
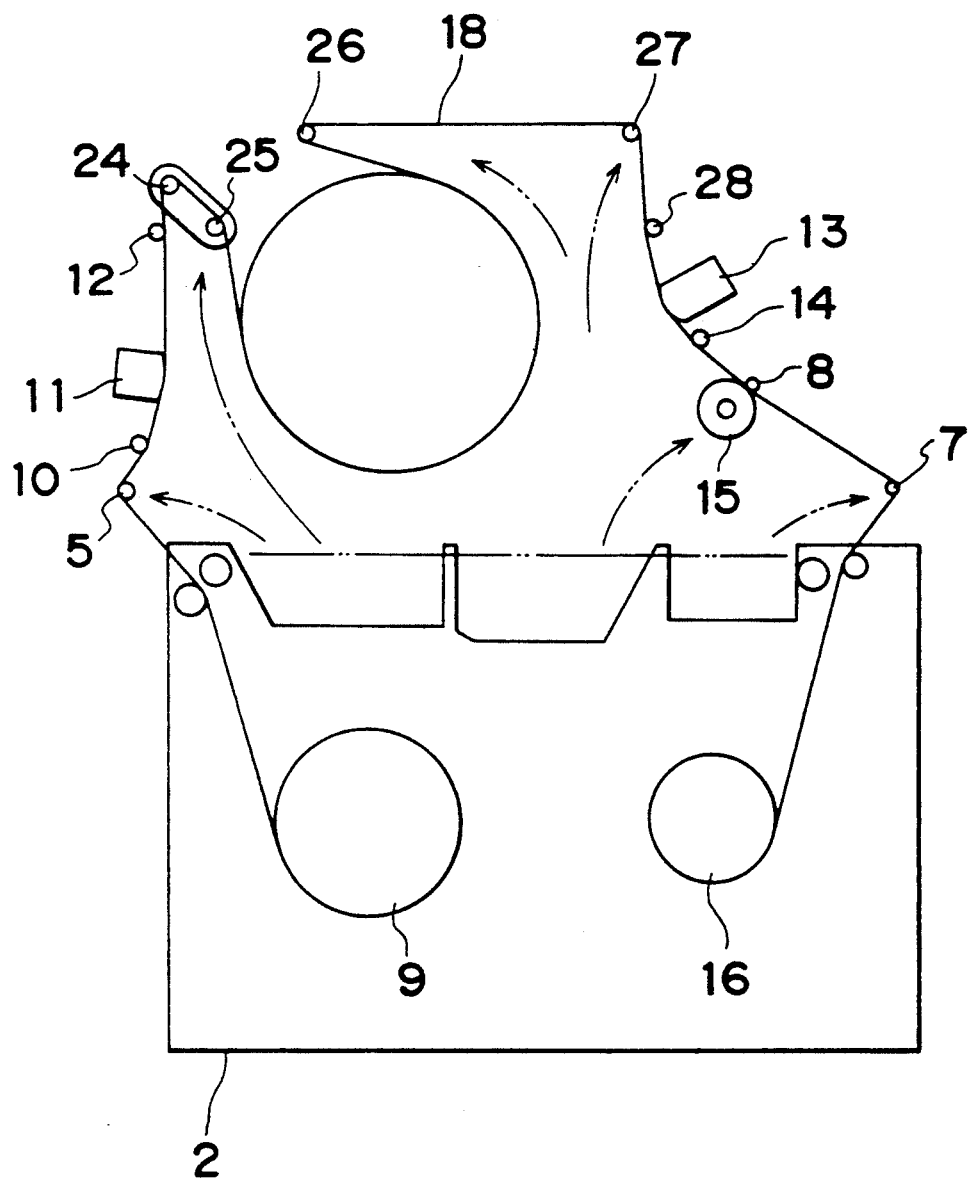
FIG. 2 is a view similar to FIG. 1, in the case where a tape loading device according to the present invention is used.

FIG. 2 depicts a tape path in the case where a tape loading device of a video tape recorder according to the present invention is used. A tape 18 taken out of a cassette 2 is fed to a video head cylinder 4 past guide posts 5 and 10, a full-width erasing head 11, a guide post 12, a vertical roller post 24, and an inclined post 25. The tape path is changed from a horizontal path to an inclined path by the inclined post 25. The tape 18 taken out of the video head cylinder 4 by a roller post 26 is guided by a roller post 27 and wound around a take-up reel 16 of the cassette 2 through an inclined stationary post 28, a sound control head 13, a guide post 14, the gap between the capstan 8 and a pinch roller 15, and a guide post 7.

The tape 18 taken out of the video head cylinder 4 in this way forms a tape path by being passed around the freely rotatable roller posts 26 and 27. Therefore, as compared with the conventional tape path in which a tape is taken out of the video head cylinder 4 by the roller post 21 and guided by the inclined stationary posts 22 and 6, the tension applied to the tape 18 ahead of the capstan 8 can be greatly reduced. Consequently, the torque to be imposed upon the capstan 8 becomes small and as such, the capstan 8 can be made small and the electric power consumption can be reduced.

In the above-described construction, since the roller post 27 and the inclined stationary post 28 are appropriately brought into contact with the internal surface and the external surface of the tape path, respectively, the tape 18 is no longer subjected to any unfavorable influence. Therefore, the tape is not twisted nor does it slip down from the guide posts due to the difference in tape height, and the tape path can be reliably changed from the inclined path to the horizontal path.

Figure 3:
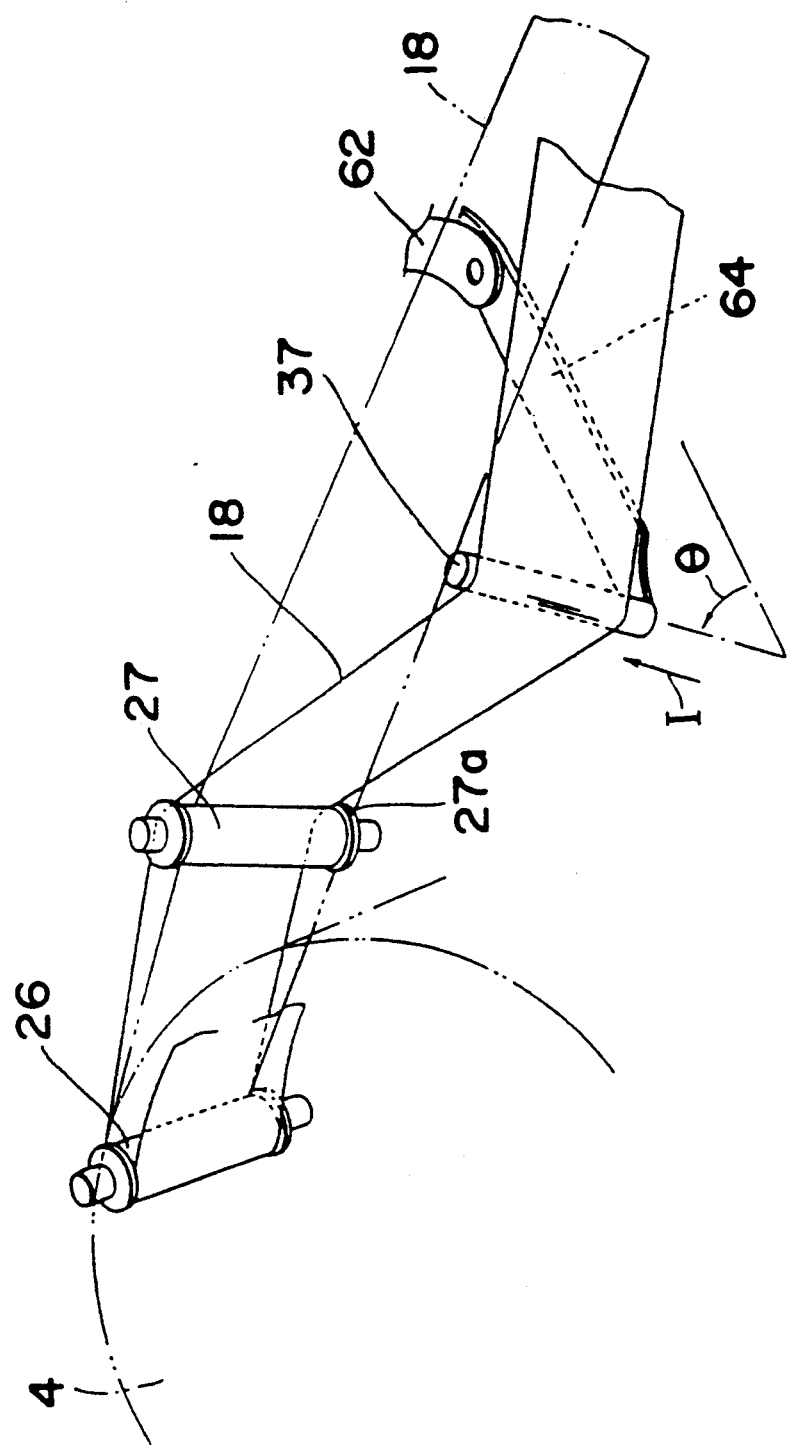
FIG. 3 is a perspective view of a principal portion of the tape loading device in the course of the tape loading process.

FIG. 3 depicts the loading conditions of the tape 18.

As shown in FIG. 3, an auxiliary inclined post 37 which is inclined at an angle of $\theta$ is pressed against the tape 18 from the outer side of the looped tape 18 in the direction in which the auxiliary inclined post 37 crosses the looped tape 18.

Figure 5:
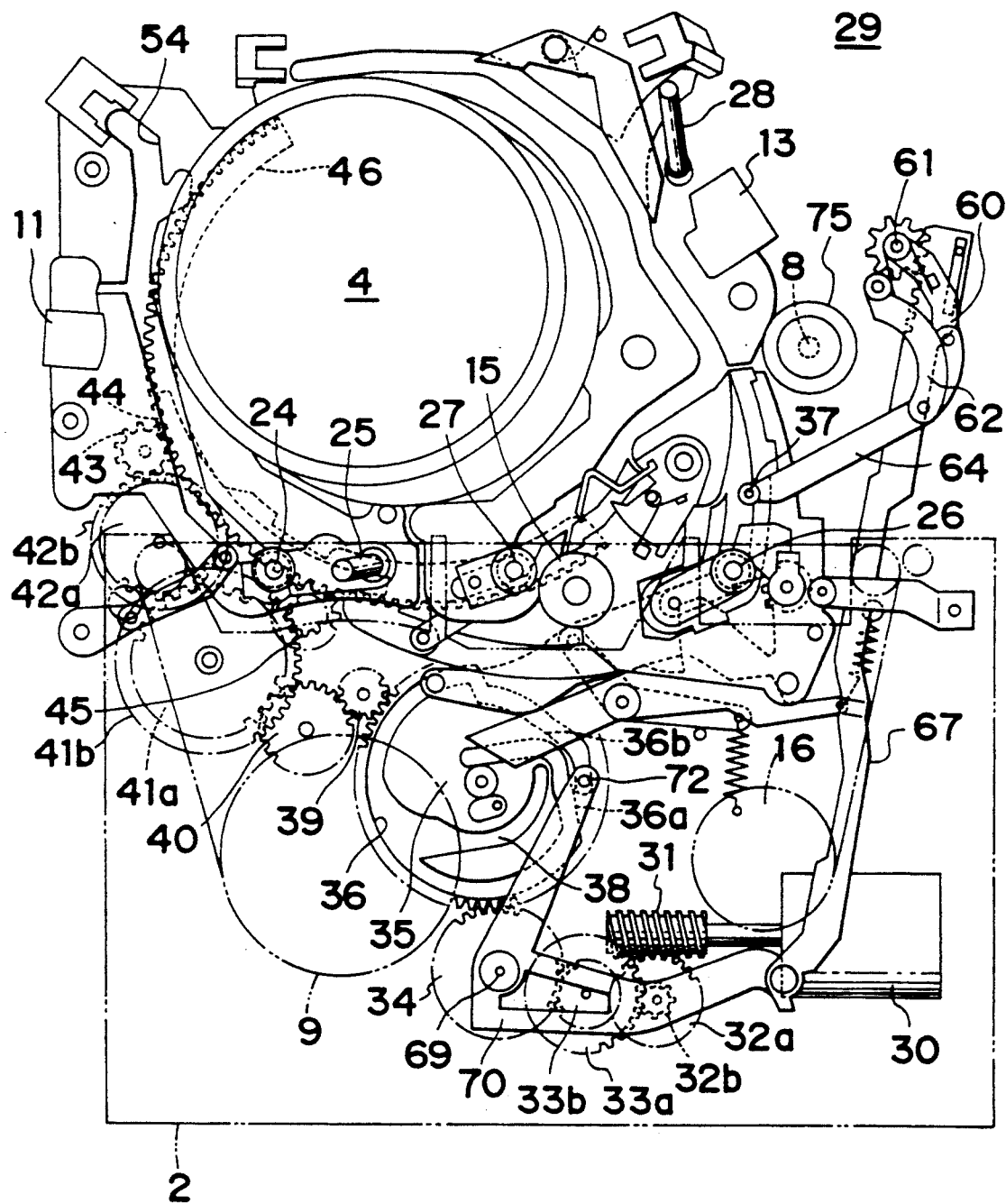
FIGS. 5 through 7 are detail views of the mechanism of a video tape recorder and the tape loading device for explaining the tape loading process.
Figure 6:
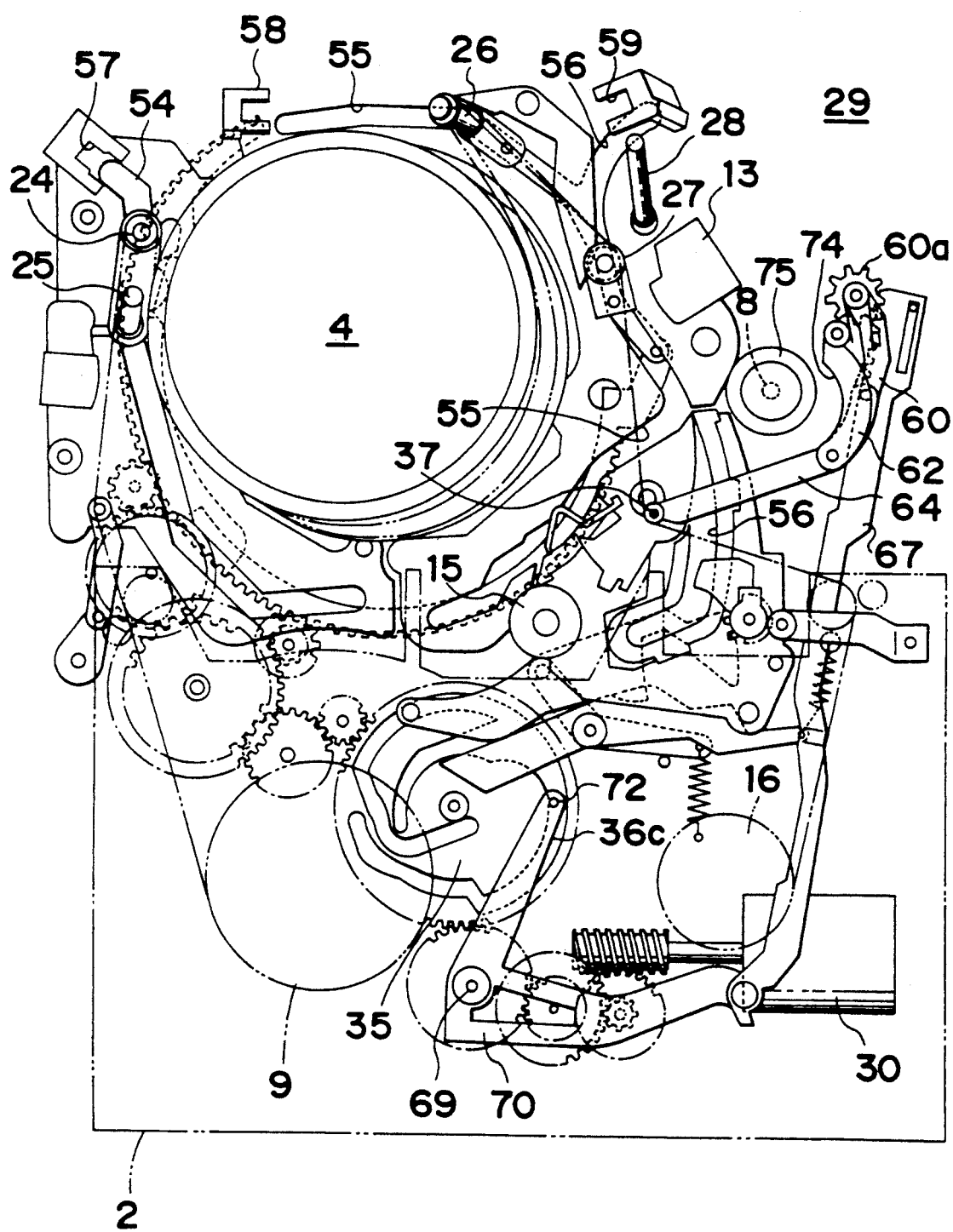
Figure 7:
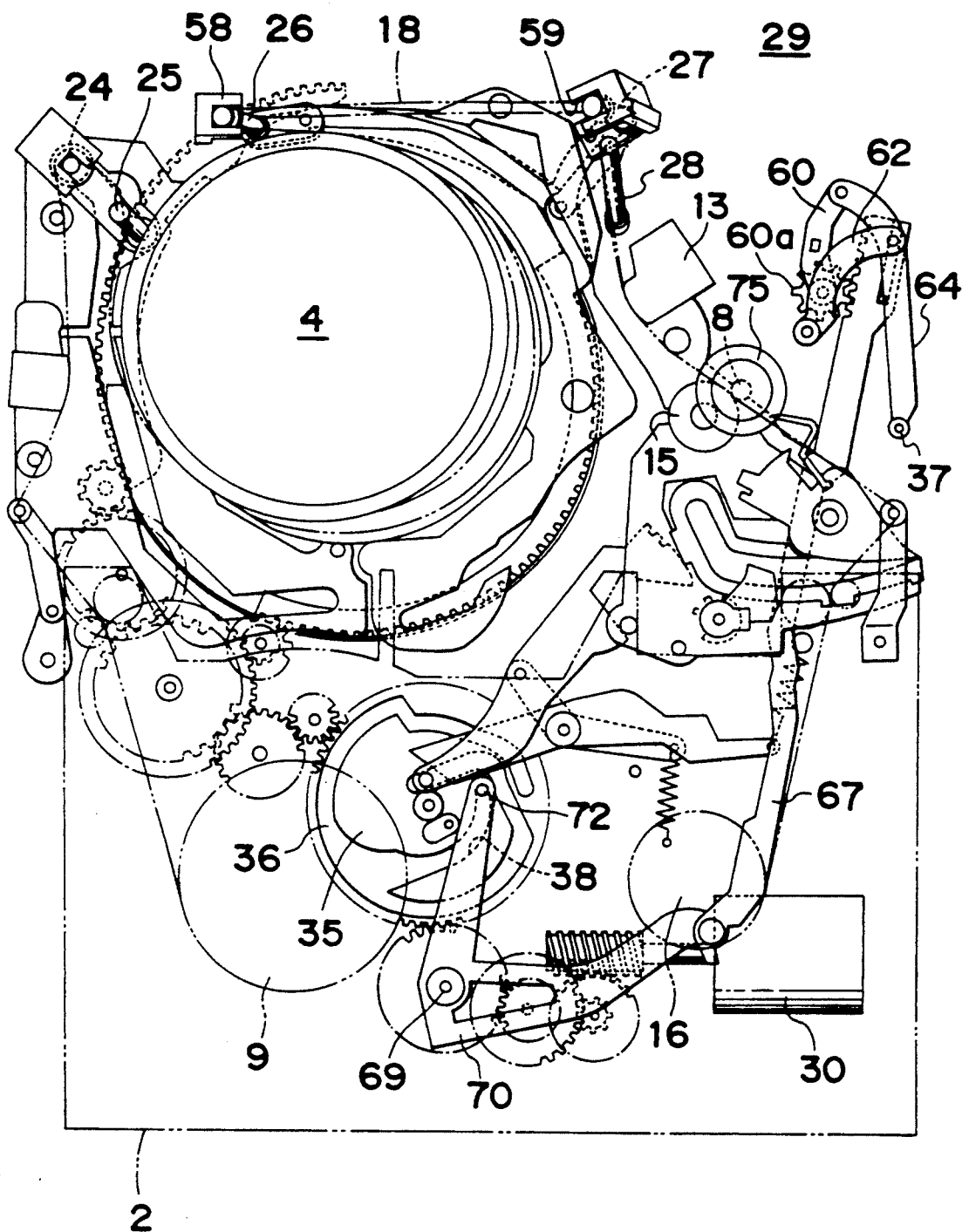

FIGS. 5 through 7 depict a tape loading process. The following driving mechanism is mounted on the upper surface of a chassis 29 having the video head cylinder 4 mounted thereon. When a worm gear 31 mounted on an output shaft of a loading motor 30 rotates, a cam gear 35 is driven through gears 32a, 32b, 33a, and 34. In the upper surface of the cam gear 35 are formed a first cam groove 36 for driving the pinch roller 15 toward the capstan 8 and a second cam groove 38, branched from an intermediate position of the first cam groove 36, for driving the auxiliary inclined post 37. The rotation of the cam gear 35 is transmitted to a circular arc gear 44 through gears 39, 40, 41a, 42a, 42b, and 43. The gear 41a also drives a circular arc gear 46 through gears 41b and 45.

Figure 8:
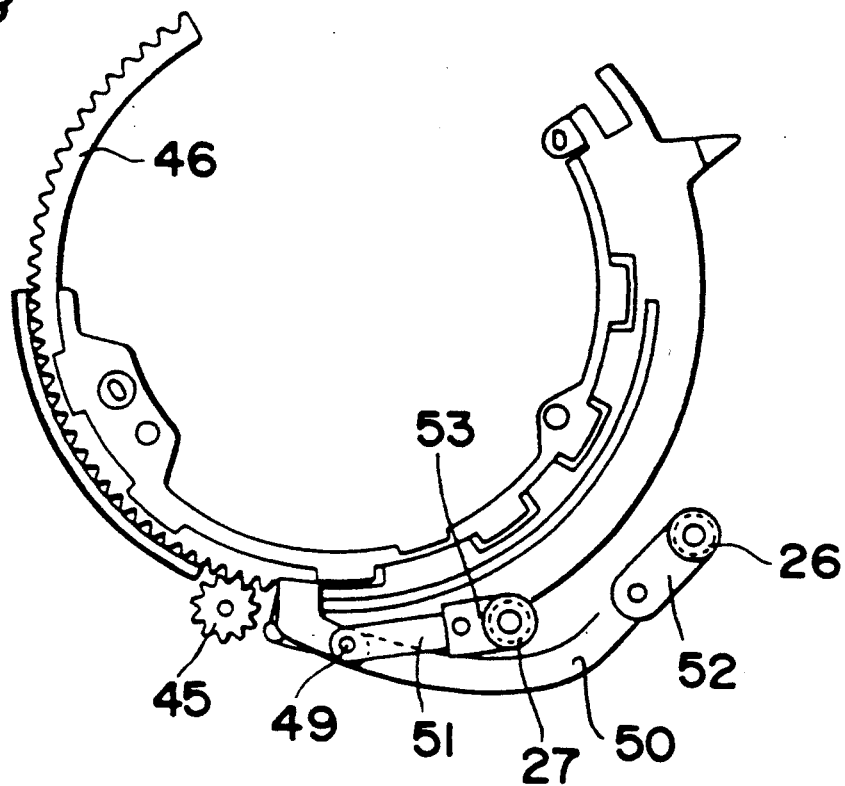
FIGS. 8 and 9 are top plan views of constituent elements of the tape loading device.
Figure 9:
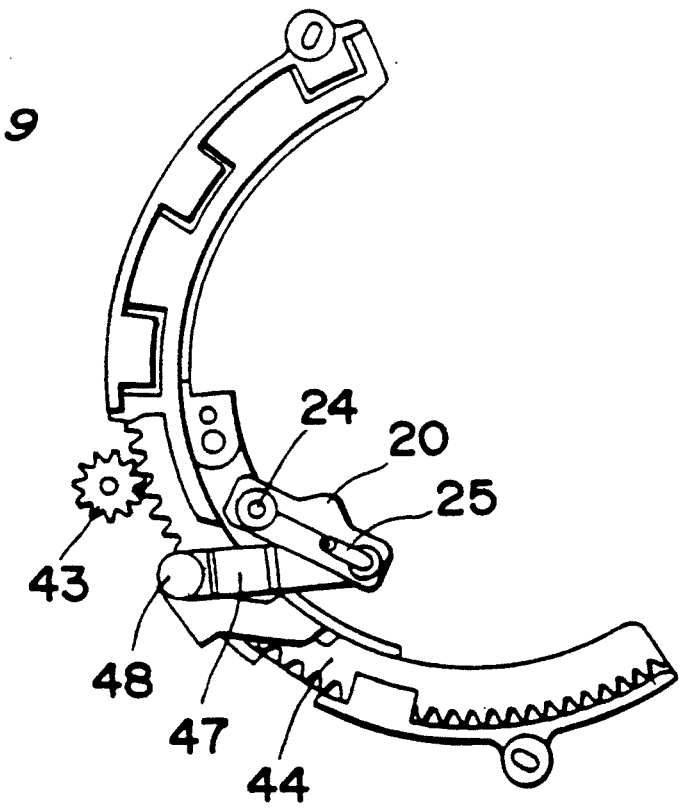

As shown in FIG. 9, one end of an arm 47 is pivotally mounted on the circular arc gear 44 through a pin 48, and the other end thereof is pivotally mounted on a base 20 of the loading guide post 1a. As shown in FIG. 8, one end of each of arms 50 and 51 is pivotally mounted on the circular arc gear 46 through a pin 49, while the other end of the arm 50 is pivotally mounted on a base 52 of the roller post 26, and that of the arm 51 is pivotally mounted on a base 53 of the roller post 27.

When the circular arc gears 44 and 46 are driven by the gears 43 and 45, respectively, the base 20 moves clockwise around the video head cylinder 4 along a guide opening 54 of the chassis 29 as shown in FIG. 6, and the bases 52 and 53 move counterclockwise along guide openings 55 and 56 of the chassis 29, respectively, as shown in FIG. 6.

Figure 4:
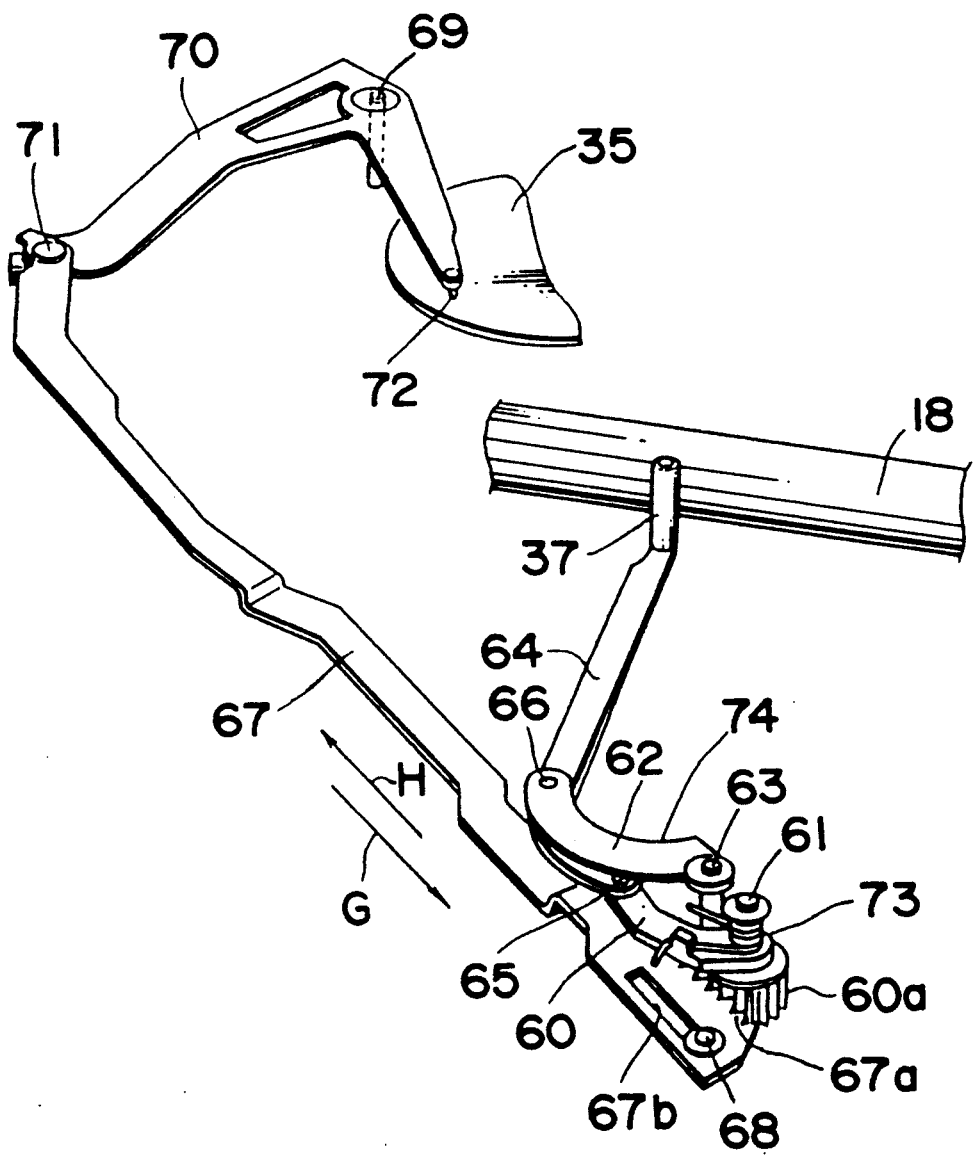
FIG. 4 is a perspective view of a driving system for driving an auxiliary inclined post of the tape loading device.

The driving system of the auxiliary inclined post 37 is constructed as shown in FIG. 4. A first link 60 having a gear 60a formed at one end thereof is pivotally supported by a shaft 61 mounted on the chassis 29. A second link 62 is pivotally supported at its one end by a shaft 63, which is mounted on the chassis 29 and spaced a small distance from the shaft 61. The other end of the first link 60 is coupled by a pin 65 to the base portion of a post arm 64 having the auxiliary inclined post 37 formed at one end thereof, and the other end of the second link 62 is coupled to an intermediate portion of the post arm 64 through a pin 66. The gear 60a of the first link 60 engages a rack 67a formed on one end of a lever 67 driven in synchronization with the tape loading operation. In addition to the rack 67a, an elongated opening 67b is formed in the same end of the lever 67. A pin 68 mounted on the chassis 29 is inserted in the elongated opening 67b of the lever 67 so that the lever 67 can rotate around the pin 68 and the rack 67a can engage the gear 60a.

The other end of the lever 67 is coupled, through a pin 71, to one end of an L-shaped arm 70, the center of which is pivotally supported by a pin 69 mounted on the chassis 29. A cam pin 72 which engages the first cam groove 36 of the cam gear 35 is formed on the other end of the arm 70. A spring 73 is interposed between the first link 60 and the shaft 63, so that the lever 67 is urged in a direction shown by an arrow G in FIG. 42, and the cam pin 72 is in contact with a side wall of the cam groove 36 of the cam gear 35. Thus, the position of the post arm 64 is regulated through the arm 70, the lever 67, and the first link 60. Immediately before the loading operation starts, the cam pin 72 is positioned at the loading start portion 36a of the first cam groove 36 as shown in FIG. 5.

When the cam gear 35 starts rotating with the start of the loading operation, the cam pin 72 is guided by a small diameter circular arc portion 36b of the first cam groove 36. As a result, the arm 70 rotates slightly counterclockwise, which causes the gear 60a to rotate counterclockwise through the rack 67a of the lever 67. In this event, the post arm 64 having the auxiliary inclined post 37 formed at one end thereof moves backward from the position shown in FIG. 5 in a direction shown by an arrow H.

Figure 1:
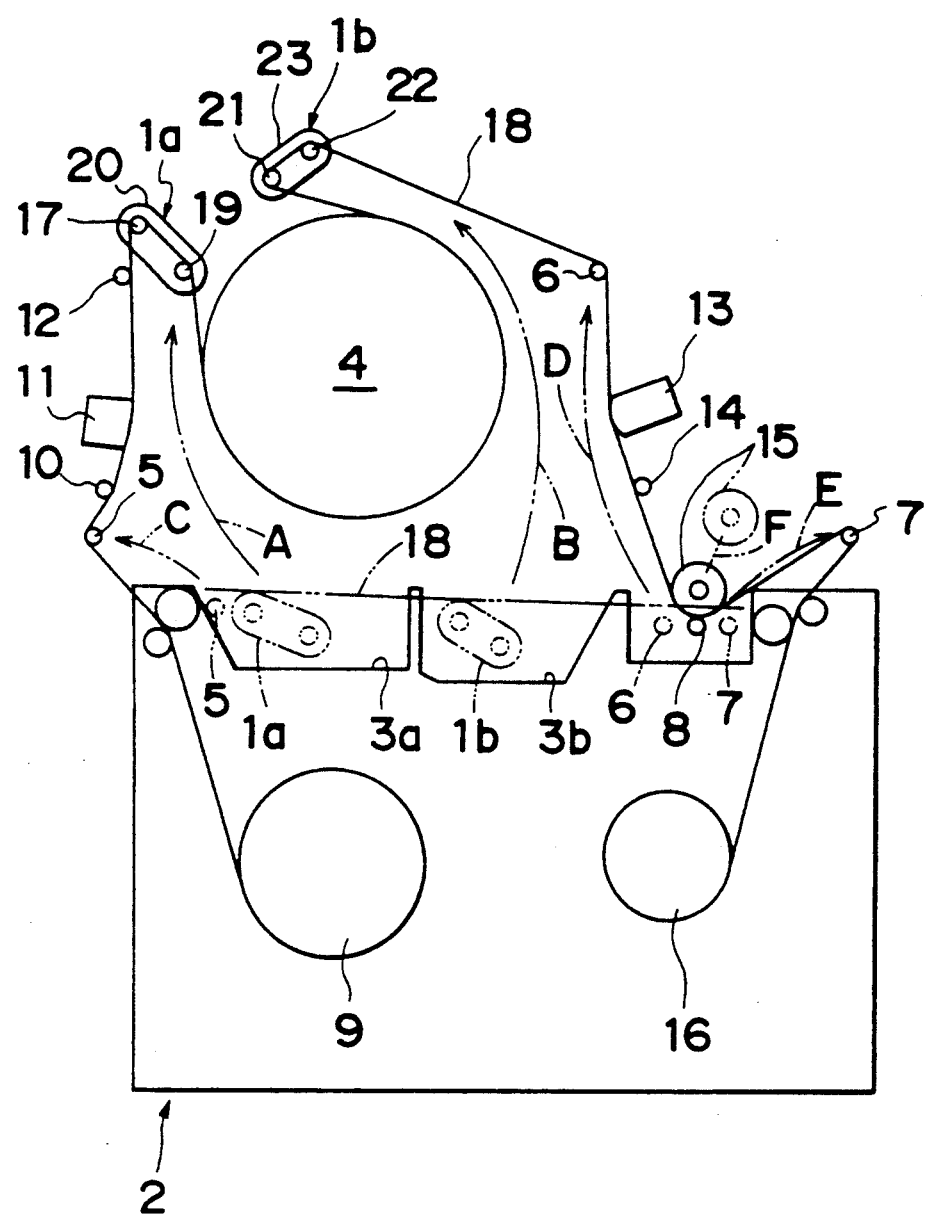
FIG. 1 is a schematic view of a conventional tape path.

As shown in FIG. 6, during the subsequent loading operation, the tape 18 is taken out of the cassette 2 by the roller posts 24 and 26, and the cam pin 72 is pressed upward toward the circular arc portion 36c of the first cam groove 36 after the roller posts 26 and 27 have passed. As a result, the arm 70 rotates clockwise and the lever 67 moves in the direction shown by the arrow G, thereby moving the auxiliary inclined post 37 so as to push the tape 18 inwardly as shown in FIG. 3. Since the auxiliary inclined post 37 inclines an angle of θ as shown in FIG. 1, the tape 18 pushed by the auxiliary inclined post 37 moves upward in a direction shown by an arrow I along the auxiliary inclined post 37, thereby appropriately positioning the tape 18 on a flange 27a of the roller post 27. As a result, the magnetic surface of the tape 18 is no longer damaged by the flange 27a of the roller post 27 during the loading operation. Furthermore, since the tape winding angle with respect to the roller post 27 can be increased during the loading operation by the auxiliary inclined post 37 pressed against the tape 18, the tape 18 does not fall during the loading operation and an excessive torsion which may be imposed upon the tape 18 can be removed by the inclination of the auxiliary inclination post 37.

When the loading operation is completed, the roller posts 24, 26, and 27 are held in V-shaped grooves 57, 58, and 59 formed in the chassis 29, respectively, as shown in FIG. 7. In this event, the roller post 27 is set in the vicinity of the inclined stationary post 28 and is in contact with the internal surface of the tape 18 whereas the inclined stationary post 28 is in contact with the external surface of the tape 18.

During the process from the conditions in which the auxiliary inclined post 37 is directed inwardly as shown in FIG. 6 to the conditions in which the loading operation is completed as shown in FIG. 7, the cam pin 72 is guided, by the urging force of the spring 73, along the second cam groove 38, which is branched from the first cam groove 36 and is so formed as to extend toward the center of the cam gear 35. Accordingly, the auxiliary inclined post 37 rapidly moves outwardly and is kept out of contact with the tape 18, as shown in FIG. 7, when the loading operation has been completed.

As described previously, since the post arm 64 having the auxiliary inclined post 37 is supported by the first and second links 60 and 62, the auxiliary inclined post 37 can be reliably moved between two predetermined positions only by pivoting the first link 60. Further, since a curved portion 74 is formed in the second link 62, the auxiliary inclined post 37 can be moved to the predetermined positions although the shaft receiving portion 75 for the capstan 8 is provided in the vicinity of the pivotal path of the second link 62. Therefore, a limited narrow space can be effectively used.

In the above embodiment, the first link 60 is driven by moving the lever 67 through the cam gear 35, the cam pin 72, and the arm 70 so that the auxiliary inclined post 37 may be moved between two predetermined positions. However, the auxiliary inclined post 37 may be moved by any other driving sources.

As described above, according to the present invention, since the auxiliary inclined post can move the tape inwardly during the tape loading operation so that the tape winding angle with respect to the third guide post becomes large, the tape height can be adjusted during the loading operation. Furthermore, the tape is not damaged during the loading operation because the magnetic surface of the tape is not brought into contact with the flange formed on the lower portion of the third guide post. Moreover, the enlargement of the tape winding angle with respect to the third guide post disposed immediately before the auxiliary inclined post can prevent the tape from being excessively twisted during the loading operation.

In addition, although the driving system for driving the auxiliary inclined post is simple in construction, the auxiliary inclined post can be moved between two predetermined positions by merely pivoting the first link.

Furthermore, according to the present invention, the tension imposed upon the tape in front of the capstan can be reduced, thereby minimizing the fluctuation of the relative speed of the tape and reducing the torque imposed upon the capstan. Accordingly, the capstan can be made small and the electric power consumption can be reduced.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. In a magnetic recording and/or reproducing apparatus having a chassis and a rotary magnetic head cylinder rotatably mounted on said chassis, a tape loading device comprising:

a plurality of guide members at least some of which are movable between a storage position and a recording and/or reproducing position for engaging and drawing a magnetic tape out of a tape cassette and for winding the magnetic tape around the magnetic head cylinder through a given angle therearound and together with the remainder of said guide members positioning the tape in a tape path along which the tape is to run during recording and/or reproducing;

a first link having a first end pivotaly mounted on said chassis;

a second link having a first end pivotally mounted on said chassis;

an arm member having a first end pivotally connected with a second end of said first link and an intermediate portion of said arm member being pivotally connected with a second end of said second link;

an auxiliary inclined guide member on a second end of said arm member; and a driving means connected to said at least some of said guide members for moving said at least some of said guide members in a drawing out operation from the storage position to the recording and/or reproducing position and further connected to one of said first and second links for driving said one of said first and second links in synchronization with said at least some of said guide members for moving said auxiliary inclined guide member into contact with the magnetic tape at least over a limited distance during the drawing out operation, and moving said auxiliary inclined guide member away from said tape path after said drawing out operation is completed.

2. A tape loading device of a magnetic recording and/or reproducing apparatus having a rotary magnetic head cylinder, said tape loading device comprising:

a tape guide post group for drawing a magnetic tape out of a tape cassette and winding a portion of the magnetic tape around the rotary magnetic head cylinder at a given angle and forming a magnetic tape transport path along which the magnetic tape travels from the tape cassette to the rotary magnetic head cylinder and from the rotary magnetic head cylinder to the tape cassette;

a portion of the magnetic tape transport path extending between a tape supply reel inside the tape cassette and the rotary magnetic head cylinder constituting an upstream tape path and a portion of the magnetic tape transport path extending between the rotary magnetic head cylinder and a tape take-up reel inside the tape cassette constituting a downstream tape path;

the magnetic tape having a center line in a width direction of the magnetic tape normal to the direction of transport of the magnetic tape;

said center line lying in horizontal reference plane constituted by a plane formed by the center line of the magnetic tape where the magnetic tape is wound around the tape supply reel and the tape take-up reel inside the tape cassette:

the tape transport path extending in a horizontal reference path when the tape center line lies on the horizontal reference plane and the plane of the magnetic tape is normal to the horizontal reference plane, and extending in an inclined path when in other than a horizontal reference path; and the magnetic tape having an external surface on one side thereof contacting the rotary magnetic head cylinder and an internal surface on the surface on the opposite side from the external surface;

said tape guide post group having:

only one upstream inclined tape guide post disposed along said upstream tape path at an angle other than normal to the direction of transport of the magnetic tape, said one upstream inclined tape guide post, after completion of a tape loading operation, contacting the internal surface of the magnetic tape and guiding the magnetic tape from a horizontal reference path portion of said upstream tape path extending from the tape supply reel in the tape cassette to said one upstream inclined tape guide post to an inclined reference path portion of said upstream tape path from said one upstream inclined tape post to the rotary magnetic head cylinder and then along an outer circumferential surface of the rotary magnetic head cylinder;

only one downstream inclined tape guide post disposed along said downstream tape path and at an angle other than normal to the direction of transport of the magnetic tape, said one downstream inclined tape guide post, after completion of a tape loading operation, contacting the external surface of the magnetic tape for restoring the magnetic tape from an inclined path portion of said downstream tape path extending from said rotary magnetic head cylinder to said one downstream inclined tape guide post to a horizontal reference path portion of said downstream tape path extending from said one downstream inclined tape guide post to the take-up reel in the tape cassette; and at least two vertical tape guide members normal to the direction of transport of the magnetic tape and positioned along said inclined path portion of said downstream tape path and contacting the inside surface of the magnetic tape.

* * * * *